United States Patent
Kim et al.

(10) Patent No.: US 7,406,337 B2
(45) Date of Patent: Jul. 29, 2008

(54) WIRELESS COMMUNICATION SYSTEM AND METHOD USING MULTIPLE ANTENNAS

(75) Inventors: Sung-jin Kim, Suwon-si (KR); Jianjun Li, Yongin-si (KR); Ho-jin Kim, Seoul (KR); Eung-sun Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 946 days.

(21) Appl. No.: 10/778,340

(22) Filed: Feb. 17, 2004

(65) Prior Publication Data

US 2004/0224725 A1 Nov. 11, 2004

(30) Foreign Application Priority Data

Feb. 17, 2003 (KR) .................. 10-2003-0009909

(51) Int. Cl.
*H04B 1/38* (2006.01)
*H04M 1/00* (2006.01)

(52) U.S. Cl. ............... 455/562.1; 455/522; 455/452.2; 455/69; 455/67.13; 455/67.11; 455/276.1; 370/252; 370/329; 375/267; 375/346; 375/148; 342/378; 342/382

(58) Field of Classification Search .......... 455/562.1, 455/522, 69, 67.16, 67.13, 452.2, 67.11, 455/272, 276.1; 370/252, 329; 375/267
See application file for complete search history.

(56) References Cited

U.S. PATENT DOCUMENTS 5,991,273 A * 11/1999 Abu-Dayya ............. 370/252
6,101,399 A * 8/2000 Raleigh et al. ........... 455/561
6,177,906 B1 * 1/2001 Petrus .................... 342/378
6,275,543 B1 * 8/2001 Petrus et al. ............ 375/324
6,314,147 B1 * 11/2001 Liang et al. ............. 375/346

(Continued)

FOREIGN PATENT DOCUMENTS

EP 1 143 636 A2 10/2001

(Continued)

OTHER PUBLICATIONS

3GPP TR25.858* [Internet site: http://www.3gpp.org/ftp/specs/html%Dinfo/25858.htm].

(Continued)

*Primary Examiner*—Marceau Milord
(74) *Attorney, Agent, or Firm*—Lee & Morse, P.C.

(57) ABSTRACT

A wireless communication system, and method using multiple antennas, includes a base station that applies predetermined weight vectors to multi-user signals and transmits the multi-user signals through a plurality of transmission antennas, and a plurality of mobile stations that receive and process the multi-user signals, wherein each mobile station includes a signal reception unit that processes the multi-user signals, and a feedback signal generation unit that estimates channel characteristics, over which the multi-user signals have been transmitted, from the multi-user signals, classifies a plurality of weight vectors to be applied to the estimated channel characteristics into a plurality of sets such that vectors orthogonal to one another are classified into a single set, selects a set maximizing a transmission capacity from among the classified sets, and feeds back weight indexes of weight vectors included in the selected set and weighted channel information to the base station.

26 Claims, 5 Drawing Sheets

U.S. PATENT DOCUMENTS

| | | | |
|---|---|---|---|
| 6,320,898 B1 | 11/2001 | Newson et al. | |
| 6,347,234 B1 * | 2/2002 | Scherzer | 455/562.1 |
| 6,351,499 B1 | 2/2002 | Paulraj et al. | |
| 6,404,803 B1 * | 6/2002 | Wang et al. | 375/148 |
| 6,463,295 B1 * | 10/2002 | Yun | 455/522 |
| 6,751,199 B1 * | 6/2004 | Sindhushayana et al. | 370/252 |
| 6,754,473 B1 * | 6/2004 | Choi et al. | 455/101 |
| 6,754,475 B1 * | 6/2004 | Harrison et al. | 455/115.1 |
| 6,763,011 B1 * | 7/2004 | Hakkinen et al. | 370/337 |
| 6,766,144 B2 * | 7/2004 | Kim et al. | 455/67.11 |
| 6,771,219 B2 * | 8/2004 | Sim | 342/382 |
| 6,892,059 B1 * | 5/2005 | Kim et al. | 455/272 |
| 6,898,250 B2 * | 5/2005 | Lee et al. | 375/267 |
| 6,985,466 B1 * | 1/2006 | Yun et al. | 370/335 |
| 7,035,661 B1 * | 4/2006 | Yun | 455/522 |
| 7,068,977 B1 * | 6/2006 | Yang et al. | 455/67.13 |
| 7,072,409 B2 * | 7/2006 | Suzuki et al. | 375/259 |
| 7,079,514 B2 * | 7/2006 | Kim et al. | 370/335 |
| 7,079,867 B2 * | 7/2006 | Chun et al. | 455/562.1 |
| 7,116,723 B2 * | 10/2006 | Kim et al. | 375/267 |
| 7,116,944 B2 * | 10/2006 | Das et al. | 455/69 |
| 7,130,355 B1 * | 10/2006 | Al-Dhahir et al. | 375/267 |
| 7,133,461 B2 * | 11/2006 | Thomas et al. | 375/295 |
| 7,155,177 B2 * | 12/2006 | Jootar et al. | 455/101 |
| 7,158,793 B2 * | 1/2007 | Haardt | 455/450 |
| 7,180,956 B1 * | 2/2007 | Banister | 375/267 |
| 7,194,006 B2 * | 3/2007 | Wong et al. | 370/436 |
| 7,218,666 B2 * | 5/2007 | Baum et al. | 375/148 |
| 7,224,758 B1 * | 5/2007 | Banister | 375/358 |
| 7,236,478 B2 * | 6/2007 | Wu et al. | 370/334 |
| 7,248,638 B1 * | 7/2007 | Banister | 375/267 |
| 7,263,385 B2 * | 8/2007 | Gurelli et al. | 455/562.1 |
| 2004/0014434 A1 | 1/2004 | Haardt | |

FOREIGN PATENT DOCUMENTS

| | | |
|---|---|---|
| EP | 1 143 636 A3 | 10/2001 |
| WO | WO 01/03330 A1 | 1/2001 |
| WO | WO 02/33850 A1 | 4/2002 |

OTHER PUBLICATIONS

*Versions furnished: v.5.0.0(Mar. 2002) and v.1.0.0(Dec. 2001).

* cited by examiner

WIRELESS COMMUNICATION SYSTEM AND METHOD USING MULTIPLE ANTENNAS

BACKGROUND OF THE INVENTION

1. Field of the Invention

The present invention relates to a wireless communication system and method using multiple antennas. More particularly, the present invention relates to a wireless communication system and method using multiple antennas, by which a transmission throughput can be maximized in a multi-user environment employing a high-speed downlink packet access (HSDPA).

2. Description of the Related Art

Unlike conventional personal communication service (PCS) wireless communication systems, next-generation wireless communication systems transmit data at a higher rate. To transmit packets at a high speed through a downlink, the 3rd Generation Partnership Project (3GPP), a standardization organization for asynchronous mode, led by Europe and Japan, has standardized an HSDPA technique, and the 3GPP2, a standardization organization for synchronous mode, led by the United States, has standardized a 1xEvolution Data Only/Voice (1xEV-DO/V) technique.

The two standard organizations have suggested HSDPA to smoothly provide Internet services including web services. The HSDPA technique is optimized to a peak throughput as well as an average throughput, thereby accomplishing smooth transmission of packets, such as data, as well as circuit transmission, such as voice communication.

To implement the HSDPA technique, an Adaptive Modulation and Coding (AMC) technique, a Hybrid Automatic Repeat reQuest (HARQ) technique, and a multi-user diversity scheduling technique are fundamentally needed. Furthermore, to overcome a limit of a given bandwidth, an efficient multiple antenna technique is required. These techniques are described on the Internet site of the 3GPP, www.3gpp.org, and described in detail in an official document TR25.858, which may be located at http://www.3gpp.org/ftp/specs/html%2Dinfo/25858.htm. The official document TR 25.858 is entitled "Physical Layer Aspects of UTRA (UMTS Radio Access Network) High Speed Downlink Packet Access," reported by Amitabha Ghosh.

In multi-user diversity scheduling, channels through which users request packets are fed back, a mobile station on a channel in a best state among the fed back channels is detected, and the packets are preferentially transmitted to the detected mobile station so that a diversity effect including signal-to-noise ratio (SNR) gain can be achieved. A diversity order indicating a degree of diversity gain corresponds to a number of users requesting packets simultaneously.

The multiple antenna technique overcoming the limit of a bandwidth uses a geometric space axis when it is used by way of beam-forming, and therefore, the limit of resources of bandwidth in a frequency axis can be overcome. To increase the bandwidth in the frequency axis, a nulling technique is used. Beam-forming is a process that performs nulling using a correlation between antennas which are close to each other, for example, separated from each other by a distance of $\lambda/2$ (where $\lambda$ is a wavelength). Nulling is a technique of conditioning antenna weights to satisfy $w_1^H h_2=0$ and $w_2^H h_1=0$ so that a signal $r_1$ received by a first user does not include data $d_2$ of a second user while a signal $r_2$ received by the second user does not include data $d_1$ of the first user.

$$r_1=(d_1 w_1^H+d_2 w_2^H)h_1+n_1=(d_1 w_1^H+0)h_1+n_1$$

$$r_2=(d_1 w_1^H+d_2 w_2^H)h_2+n_2=(0+d_2 w_2^H)h_2+n_2 \quad \text{Formula (1)}$$

Here, $w_1$ and $w_2$ denote matrices expressing weights, respectively, $h_1$ and $h_2$ denote channels, $n_1$ and $n_2$ denote noises mixed with the respective reception signals $r_1$ and $r_2$, and H indicates a Hermitian matrix.

When channel conditions are configured to produce weights satisfying Formula (1), influence on other user channels can be completely removed, so that substantial transmission capacity can be doubled. Theoretically, if the number of other users to be nulled in a beam-forming environment is one fewer than the sum of the number of users requesting signal transmission and the number of antennas, nulling is always possible. However, such an idealistic state can be accomplished when correlation between antennas completely exists and only phases of the antennas differ from each other. Accordingly, it is very difficult to implement a beam-forming nulling technique in a wireless communication environment. Moreover, in diversity systems including multiple antennas to overcome channel fading, since antennas are far apart from each other by, for example, 10 $\lambda$, correlation between antennas rarely exists. Consequently, it is difficult to adopt a usual nulling technique applicable to beam-forming to diversity systems.

When there are multiple users wishing to transmit data to a base station simultaneously, usually multi-user transmission using orthogonality of a spreading code is used. However, even in a method using the orthogonality of a spreading code, multipath fading occurs, resulting in self interference (SI) between multiple codes and multiple access interference. As a result, a nulling effect due to a spreading code is reduced, and therefore, performance is remarkably degraded. Accordingly, the nulling technique is required to be applied to multiple antennas in diversity mode.

The following description concerns a multiple antenna technique in diversity mode.

Typically, wireless communication systems are configured so that multiple mobile stations communicate with one another through a single base station. To transmit data at a high speed in such wireless communication systems, loss according to a characteristic of a wireless communication channel, such as fading, and interference for each user need to be minimized. Fading may reduce the amplitude of a reception signal by several dB through several tens of dB. To overcome fading, a variety of diversity techniques may be used.

Code Division Multiple Access (CDMA) usually uses a rake receiver performing diversity reception using delay spread of a channel. The rake receiver employs a reception diversity technique for receiving multipath signals. However, such a diversity technique has a problem in that it does not operation when a delay spread is small.

Diversity is largely divided into space diversity and time diversity. Space diversity uses multiple antennas. Time diversity uses interference and coding and is usually used for a Doppler spread channel. However, it is difficult to use time diversity in a low-speed Doppler channel. Generally, space diversity is used to overcome fading in an indoor channel having a small delay spread and in a pedestrian channel, which is a low-speed Doppler channel. Space diversity uses two or more antennas so that when a signal received through one antenna is attenuated due to fading, the signal can be received through another antenna. Space diversity is divided into transmission diversity and reception diversity according to an employed antenna type. It is difficult to install reception antennal diversity in a mobile station in terms of installation area and cost, and therefore, it is recommended to use transmission antenna diversity in a base station.

Transmission antenna diversity is divided into closed loop transmission diversity, in which a base station receives downlink channel information fed back from a mobile station, and open loop transmission diversity, in which there is no feedback from a mobile station to a base station. In transmission diversity, a mobile station measures the phase and amplitude of a channel and finds an optimal weight. A base station sends different pilot signals through respective antennas to measure the amplitude and phase of a channel. The mobile station measures the amplitude and phase of the channel using a pilot signal and finds an optimal weight based on the measured amplitude and phase of the channel.

In multiple antenna systems using diversity, transmission antenna array (TxAA) mode 1 and TxAA mode 2 are closed loop transmission diversity using two antennas. TxAA mode 1 and TxAA mode 2 were standardized by 3GPP, which is an International Mobile Telecommunications (IMT-2000) standardization organization led by Europe and Japan, and distributed as version Release (R) 99. TxAA mode 1, suggested by Nokia, feeds back only a phase difference between two antennas. TxAA mode 2, suggested by Motorola, feeds back the phases and gains of two antennas. TxAA mode 1 and mode 2 are disclosed in a specification defined by 3GPP, which is the standardization organization for Universal Mobile Telecommunications System (UMTS), which is the standard of European IMT-2000.

In TxAA mode 1 or mode 2 using closed loop transmission diversity, adaptive array antennas are used, and different complex weights are applied to respective antennas. A complex weight is a value related to a transmission channel. For example, w=h is used as the complex weight, where "w" is a transmission array antenna weight vector, and "h" is a vector expressing a transmission array channel.

In wireless communication systems using Frequency Division Duplex (FDD), the characteristics of a transmission channel are different from those of a reception channel. Accordingly, in order to detect a transmission channel in a base station, transmission channel information needs to be fed back from a mobile station to the base station. For this feedback operation, TxAA mode 1 and mode 2 are designed such that a mobile station sends weight information to a base station, and the base station obtains channel information from the weight information. In TxAA mode 1, in information on a weight $w=[|w_1|\exp(j\theta_1),|w_2|\exp(j\theta_2)]$ multiplied to each antenna, only a phase difference $\theta_1-\theta_2$ is quantized in two bits and fed back. Accordingly, a phase accuracy is $\pi/2$, and a maximum quantization error is $\pi/4$. To increase feedback efficiency, refining is performed by updating one of two bits in each feedback. For example, two bits can be combined like $\{b(2k), b(2k-1)\}$ and $\{b(2k), b(2k+1)\}$. Here, "b" is a bit that is fed back in each slot, and $2k$, $2k-1$, and $2k+1$ denote a feedback sequence of bits. In TxAA mode 2, both phase and gain that constitute weight information are fed back. A phase is fed back in three bits, and a gain is fed back in one bit. Accordingly, a phase accuracy is $\pi/4$, and a maximum quantization error is $\pi/8$. To increase feedback efficiency, progressive refining is performed by updating one among four bits in each feedback. In a refining method, each bit becomes values of an orthogonal basis. However, in a progressive refining method, such a rule is not defined.

Systems using diversity are harmonized with the characteristics of a space channel to enable coherent transmission. Consequently, in proportion to the number of antennas, an SNR increases and fading can be overcome. When a nulling technique is additionally used, a transmission throughput can be increased.

However, the nulling technique can be applied only to a beam-forming method in which a distance between antennas is limited to a predetermined value. Therefore, it is difficult to use the nulling technique for multiple diversity antennas far apart from each other. Accordingly, multiple diversity antenna systems for voice transmission are structured to omit the nulling technique. In other words, when a distance between antennas increases, a correlation between the antennas decreases. As a result, a channel change period is in inverse proportion to a maximum Doppler frequency. In an existing voice communication environment, a channel used by a user during a single frame duration is not fixed but varies, and therefore, it is impossible to apply nulling to a fixed channel. Moreover, in CDMA, the number of antennas becomes far more than the number of simultaneous users and then exceeds the degree of freedom in nulling multiple antennas, i.e., (the number of antennas−1). Accordingly, it is difficult to apply the nulling technique to a conventional diversity method using multiple antennas.

Therefore, a wireless communication system including multiple transmission/reception antennas, which is compatible with TxAA mode 1 and mode 2 and which can overcome a frame size problem and a problem related to a difference between the number of antennas and the number of users, is desired.

SUMMARY OF THE INVENTION

The present invention provides a wireless communication system and method using multiple antennas, which allow a nulling process to be performed on multiple diversity antennas in a high-speed downlink packet access environment by feeding back information on a channel state from each mobile station to a base station using a scheme of expanding a multi-user diversity scheduling method to a spatial axis, selecting a weight satisfying a predetermined condition based on multi-user diversity scheduling, and applying the selected weight to transmission antennas so that a peak throughput can be guaranteed.

According to a feature of an embodiment of the present invention, there is provided a wireless communication system including a base station that applies predetermined weight vectors to multi-user signals and transmits the multi-user signals through a plurality of transmission antennas; and a plurality of mobile stations that receive and process the multi-user signals, wherein each of the plurality of mobile station includes: a signal reception unit that processes the multi-user signals; and a feedback signal generation unit that estimates channel characteristics, over which the multi-user signals have been transmitted, from the multi-user signals, classifies a plurality of weight vectors to be applied to the estimated channel characteristics into a plurality of sets such that vectors orthogonal to one another are classified into a single set, selects a set maximizing a transmission capacity from among the classified sets, and feeds back weight indexes of weight vectors included in the selected set and weighted channel information to the base station.

In the system, a number of the plurality of weight vectors included in each set may be equal to a number of the plurality of transmission antennas. The weight indexes fed back by the feedback signal generation unit may be used as information to determine the predetermined weight vectors in the base station.

The feedback signal generation unit may include a channel characteristic estimator that estimates the channel characteristics, a quadrature weight set classifier that groups a predetermined number of vectors that are orthogonal to one another from among the plurality of weight vectors into a single set and outputs the weight indexes of the weight vectors of each set, a plurality of Signal Interference to Noise Ratio (SINR) calculators, each of which applies weight vectors included in each set to the channel characteristics and calculates SINRs using the weighted channel characteristics, a plurality of capacity calculators, each of which correspond to one of the plurality of SINR calculators, and each of which calculates transmission capacities using SINRs received from a corresponding one of the plurality of SINR calculators and sums the transmission capacities, a peak capacity selection unit that selects a capacity calculator giving a peak of the summed transmission capacities, and outputs SINRs that are received from an SINR calculator corresponding to the selected capacity calculator and weight indexes corresponding to the selected capacity calculator, and an information feedback unit that feeds back the SINRs and the weight indexes that are received from the peak capacity selection unit to the base station.

In the system, the base station and the plurality of mobile stations may comprise a same table in which indexes correspond to weight vectors, respectively.

The base station may further include a feedback signal processing unit that classifies weight indexes and SINRs, which are received from the plurality of mobile stations, for each of the plurality of mobile stations, reclassifies the classified SINRs by the weight indexes, selects a peak SINR from among the classified SINRs, classifies weight vectors corresponding to the weight indexes into a plurality of sets, selects a set giving a peak transmission capacity from among the sets, outputs weight indexes included in the selected set and predetermined types of information measured from the weight indexes and the peak SINR.

A number of the plurality of weight vectors included in each set may be equal to a number of the plurality of transmission antennas.

The feedback signal processing unit may include a feedback information analyzer that classifies the weight indexes and the SINRs, which are received from the mobile stations, for each of the mobile stations, a weight classifier that reclassifies the classified SINRs by the weight indexes, a plurality of peak selectors each of which selects a peak SINR from among the reclassified SINRs, a quadrature combination unit that combines weight vectors that are orthogonal to one another into a single set from among the weight vectors corresponding to the weight indexes, a plurality of capacity generators each of which calculates transmission capacities from peak SINRs corresponding to weight indexes of weight vectors included in each set and sums the calculated transmission capacities, and a peak capacity selector that selects a peak value from among values output from the capacity generators and outputs weight indexes included in a set corresponding to the selected peak value, mobile station indexes, and power and modulation coding information obtained from the peak SINRs.

The base station may further include a signal transmission unit that transmits the multi-user signals through the plurality of transmission antennas, the signal transmission unit including: a channel selector that selects channels corresponding to the mobile station indexes output from the peak capacity selector from among a plurality of channels, a plurality of power and modulation coding controllers that control powers of the selected channels and modulate and code the selected channels, according to the power and modulation coding information output from the peak capacity selector, a plurality of spectrum spreaders that spread signals output from the respective power and modulation coding controllers using predetermined spreading signals, respectively, and a signal processor that applies a number of transmission antenna weights equal to the number of the plurality of transmission antennas to signals output from each spectrum spreader, sums the transmission antenna weighted signals for each transmission antenna, and outputs results of summations.

In the system, each of the spectrum spreaders may use a spread spectrum code sequence $\{c[k,i](j)|j=1, \ldots, K_{SF}\}$ as the predetermined spreading signal, and the spread spectrum code sequence may be configured such that a spectrum code sequence of a k-th user is orthogonal to that of other users or the k-th user has a same characteristic as other users, where $K_{SF}$ has a value of one (1) or a greater value.

The transmission antenna weights may correspond to the weight indexes output from the peak capacity selector.

The signal reception unit of each mobile station may despread the received multi-user signals by applying different delays to respective paths, and may apply weights reflecting SINR characteristics of the despread multi-user signals for each path.

The base station may further include a signal transmission unit that transmits the multi-user signal through the plurality of transmission antennas, the signal transmission unit including a channel selector that selects channels corresponding to mobile station indexes output from the feedback signal processing unit from among a plurality of channels, a plurality of power and modulation coding controllers that control powers of the selected channels and modulate and code the selected channels, according to the predetermined types of information output from the feedback signal processing unit, a plurality of spectrum spreaders that spreads signals output from the respective power and modulation coding controllers using predetermined spreading signals, respectively, and a signal processor that applies a number of transmission antenna weights equal to a number of the plurality of transmission antennas to signals output from each spectrum spreader, sums the transmission antenna weighted signals for each transmission antenna, and outputs results of summations.

The signal reception unit of each of the plurality of mobile stations may despread the received multi-user signals by applying different delays to each path, and may apply weights reflecting SINR characteristics of the despread multi-user signals for each path.

According to another feature of an embodiment of the present invention, there is provided a mobile station that receives a user signal including multi-user signals from a base station, the mobile station including a signal reception unit that processes the user signal, and a feedback signal generation unit that estimates channel characteristics, over which the multi-user signals have been transmitted, from the multi-user signals, classifies a plurality of weight vectors to be applied to the estimated channel characteristics into a plurality of sets, selects a set maximizing a transmission capacity from among the classified sets, and feeds back indexes of weight vectors included in the selected set and weighted channel information obtained from weighted channel characteristics corresponding to the selected set to the base station.

In the mobile station, a number of weight vectors included in each set may be equal to a number of the plurality of transmission antennas included in the base station. The plurality of weight vectors used by the mobile station may be the same as the plurality of weight vectors used by the base station.

In the mobile station, the feedback signal generation unit may include a channel characteristic estimator that estimates the channel characteristics, a quadrature weight set classifier that groups a predetermined number of vectors that are orthogonal to one another from among the plurality of weight vectors into a single set and outputs the weight indexes of the weight vectors of each set, a plurality of Signal Interference to Noise Ratio (SINR) calculators, each of which separately applies weight vectors included in each set to the channel characteristics, calculates power of each weighted channel characteristic, and calculates SINRs using the calculated power, a plurality of capacity calculators, each of which corresponds to one of the plurality of SINR calculators and each of which calculates transmission capacities using SINRs received from a corresponding one of the plurality of SINR calculators and sums the transmission capacities, a peak capacity selection unit that selects a capacity calculator giving a peak of the summed transmission capacities, and outputs SINRs that are received from an SINR calculator corresponding to the selected capacity calculator and weight indexes corresponding to the selected capacity calculator, and an information feedback unit that feeds back the SINRs and the weight indexes that are received from the peak capacity selection unit to the base station.

According to still another feature of an embodiment of the present invention, there is provided a base station that processes a user signal based on mobile station index information for channel selection and Signal Interference to Noise Ratio (SINR) information of selected channels, information being fed back from a plurality of mobile stations, and transmits the processed access signal through a plurality of antennas, the base station including a feedback signal processing unit that classifies indexes and SINRs, which are received from the plurality of mobile stations, for each of the mobile stations, reclassifies the classified SINRs by the weight indexes, selects a peak SINR from among the classified SINRs, classifies weight vectors corresponding to the weight indexes into a plurality of sets, selects a set giving a peak transmission capacity from among the sets, outputs mobile station indexes and predetermined types of information measured from the peak SINR that correspond to the selected set, and a signal transmission unit that selects channels, over which the user signals are to be transmitted, using the predetermined types of information output from the feedback signal processing unit, modulates and codes the user signals, processes the user signals by applying weight vectors corresponding to the respective selected channels to the user signal, and transmits the processed user signals through the plurality of antennas.

In the base station, the feedback signal processing unit may include a feedback information analyzer that classifies the weight indexes and the SINRs, which are received from the mobile stations, for each mobile station, a weight classifier that reclassifies the classified SINRs by the weight indexes, a plurality of peak selectors each of which selects a peak SINR from among the reclassified SINRs, a quadrature combination unit that combines weight vectors that are orthogonal to one another into a single set from among the weight vectors corresponding to the weight indexes, a plurality of capacity generators each of which calculates transmission capacities from peak SINRs corresponding to weight indexes of weight vectors included in each set and sums the calculated transmission capacities, and a peak capacity selector that selects a peak value from among values output from the capacity generators and outputs weight indexes included in a set corresponding to the selected peak value, mobile station indexes, and power and modulation coding information obtained from the peak SINRs.

In the base station, the signal transmission unit may include a channel selector that selects channels corresponding to mobile station indexes output from the feedback signal processing unit from among a plurality of channels, a plurality of power and modulation coding controllers that control power of the selected channels and modulate and code the selected channels, according to the predetermined types of information output from the feedback signal processing unit, a plurality of spectrum spreaders that spreads signals output from the respective power and modulation coding controllers using predetermined spreading signals, respectively, and a signal processor that applies weights vectors corresponding to the respective selected channels to signals output from each spectrum spreader, sums the weighted signals for each transmission antenna, and outputs results of summations through the respective corresponding antennas.

According to yet another feature of an embodiment of the present invention, there is provided a wireless communication method including transmitting multi-user signals through a plurality of transmission antennas from a base station, receiving and processing the multi-user signals by a mobile station, estimating characteristics of channels, through each of which the multi-user signals are transmitted, from the detected multi-user signals, classifying a plurality of weight vectors to be applied to the measured channel characteristics into sets such that a predetermined number of weight vectors orthogonal to one another is grouped into a single set, applying each of weight vectors included in each set to the channel characteristics to generate weighted channel characteristics and selecting a set maximizing a transmission capacity based on the weighted channel characteristics of each set, and feeding back indexes of the weight vectors included in the selected set and weighed channel information obtained from the weighted channel characteristics corresponding to the selected set.

In the method, the plurality of weight vectors used by the mobile station may be the same as those used in the base station.

The method may further include the base station classifying weight indexes and weighted channel information, which are received from a plurality of mobile stations, for each of the mobile stations, reclassifying the weighted channel information by the weight indexes, selecting peak weighted channel information from each reclassified weighted channel information corresponding to each weight index and classifying weight vectors corresponding to the weight indexes into sets by combining a predetermined number of vectors orthogonal to one another into a single set, selecting a set maximizing the transmission capacity based on the peak weighted channel information corresponding to weight vectors included in each set, and outputting mobile station indexes belonging to the selected set and predetermined types of information measured from peak weighted channel information corresponding to the selected set.

In the method, the weighted channel information may indicate a Signal Interference to Noise Ratio (SINR), and the predetermined types of information may be power, modulation, and coding information.

The method may further include the base station selecting channels corresponding to the mobile station indexes from among a plurality of channels, controlling a power of each of the selected channels and modulating and coding the selected channels according to the power, modulation, and coding information, spreading signals, which have been transmitted through the power-controlled, modulated, and coded channels using predetermined spreading signals, and applying weight vectors corresponding to the selected channels to spreading signal, summing the weighted signals for each transmission antenna, and outputting a result of summing the signals through each corresponding transmission antenna.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

Korean Patent Application No. 2003-9909, filed on Feb. 17, 2003, and entitled: "Wireless Communication System and Method Using Multiple Antennas," is incorporated by reference.

The present invention will now be described more fully hereinafter with reference to the accompanying drawings, in which preferred embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Figure 1:
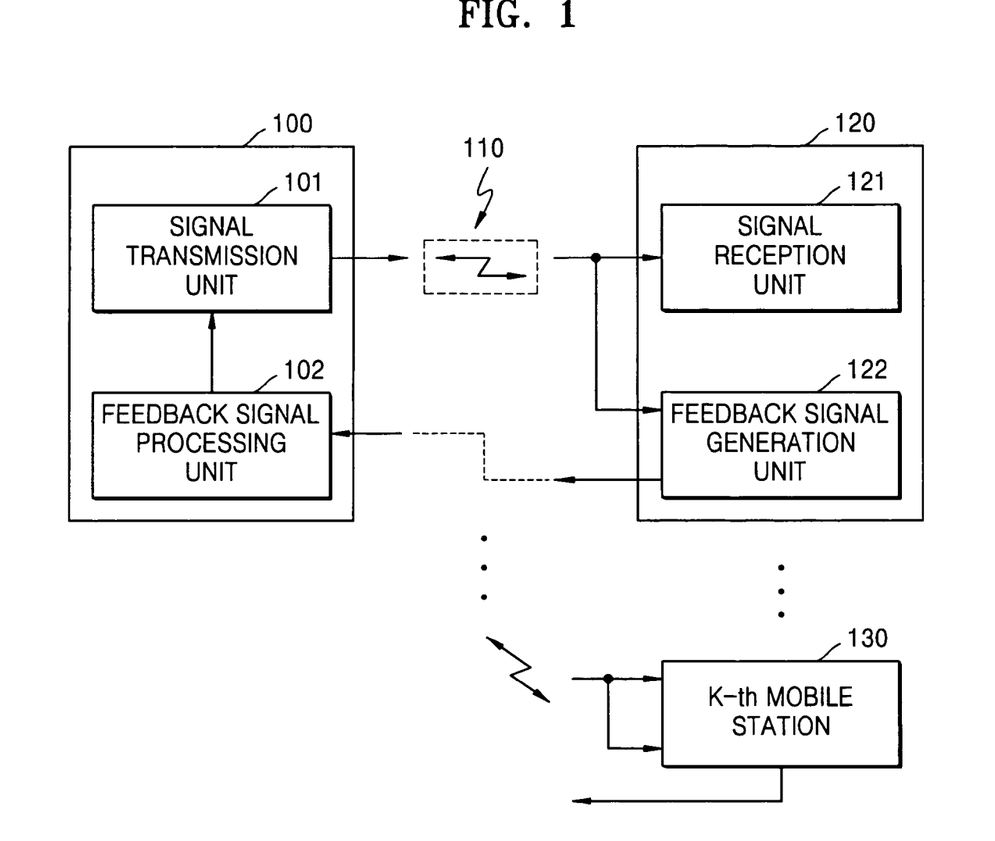
FIG. 1 is a schematic block diagram of a wireless communication system according to an embodiment of the present invention.

FIG. 1 is a schematic block diagram of a wireless communication system according to an embodiment of the present invention. The wireless communication system includes a base station 100 and a plurality of mobile stations 120 and 130 that communicate with the base station 100 through multichannels 110. The base station 100 includes a signal transmission unit 101, a feedback signal processing unit 102, and two or more transmission antennas (not shown) for signal transmission. Each of the mobile stations 120 and 130 includes a signal reception unit 121, a feedback signal generation unit 122, and one or more reception antenna (not shown).

The feedback signal processing unit 102 of the base station 100 processes a signal fed back from the feedback signal generation unit 122 of each of the mobile stations 120 and 130. The signal transmission unit 101 selects channels to be used for signal transmission referring to predetermined information output from the feedback signal processing unit 102, controls transmission power and modulation coding operations, and transmits signals using a beam-forming method. According to the beam-forming method, the signal transmission unit 101 processes the signals to be transmitted using a predetermined method, applies weights to them, and then transmits the signal through a plurality of antennas. Here, channels for mobile stations are distinguished from each another.

The signal reception unit 121 detects a signal by performing a process such as despreading with different delays applied to respective signals received through the channels selected by the signal transmission unit 101 over multipaths. The feedback signal generation unit 122 estimates channel characteristics from pilot signals received through reception antennas, generates various types of information based on the estimated channel characteristics, and feeds the information back to the base station 100.

An operation of each element will be described in detail below with reference to FIGS. 2 through 6.

Figure 2:
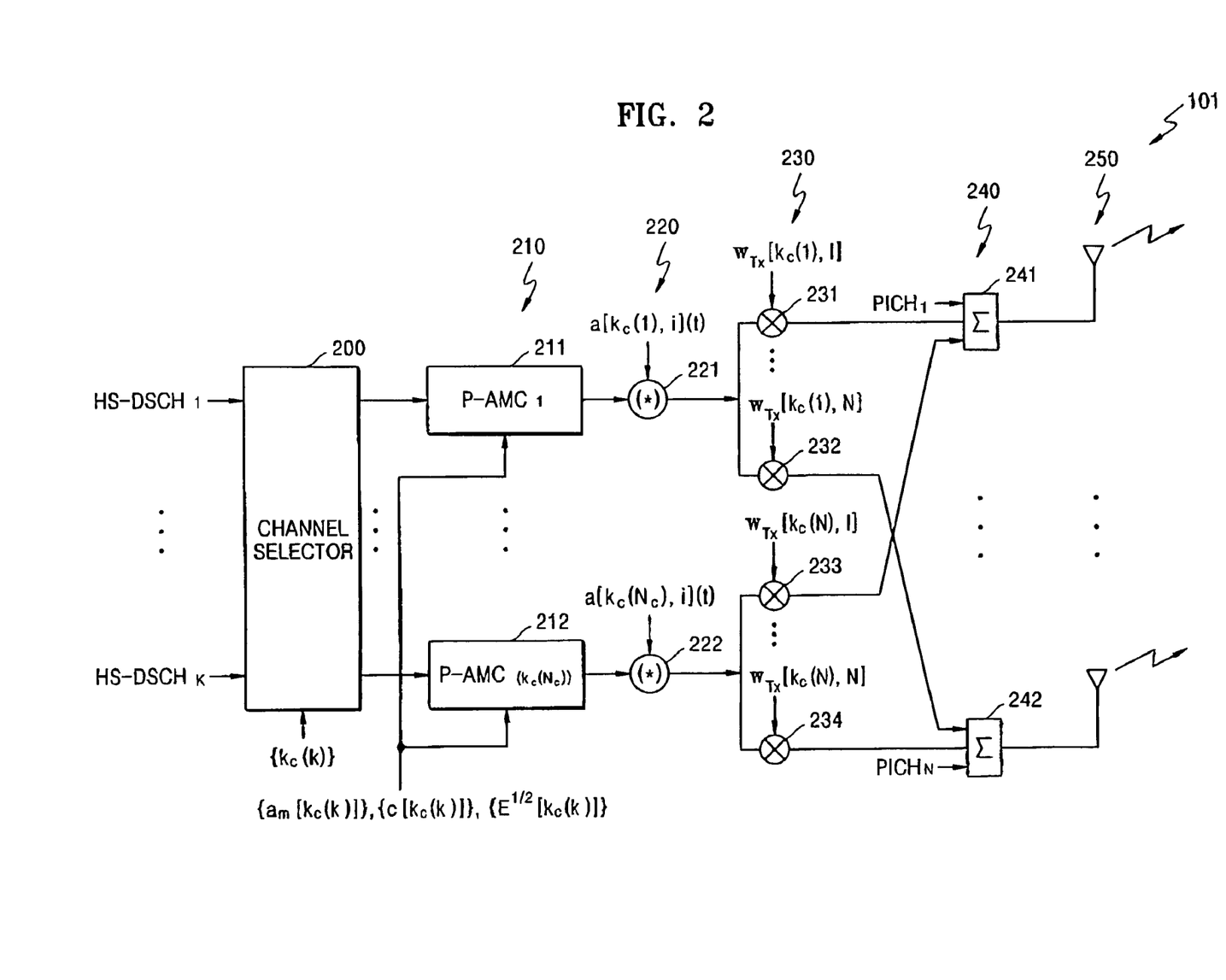
FIG. 2 is a schematic block diagram of a signal transmission unit shown in FIG. 1.

FIG. 2 is a schematic block diagram of the signal transmission unit 101. The signal transmission unit 101 includes a channel selector 200, a power and modulation coding (P-AMC) control unit 210, a spread spectrum unit 220, a weight multiplication unit 230, an adding unit 240, and an antenna unit 250.

The channel selector 200 selects N channels from among high-speed downlink shared channels $HS\text{-}DSCH_1$ through $HS\text{-}DSCH_K$ for K mobile stations according to a selection signal $\{k_c(k)|k=1, \ldots, N\}$ received from the feedback signal processing unit 102. N channels are selected based on Channel Quality Information (CQI) to maximize a transmission capacity.

The P-AMC control unit 210 includes N P-AMC controllers 211 and 212, each of which controls a power of each channel selected by the channel selector 200 and modulates and codes the channels. Modulation is performed using predetermined modulation orders $a_m[k_c(k)|k=1, \ldots, N]$ output from the feedback signal processing unit 102. A modulation order indicates a modulation method for each channel, for example, Quadrature Phase Shift Keying (QPSK) or 16-Quadrature Amplitude Modulation (16-QAM). Coding means error correction coding for the N high-speed downlink shared channels according to a predetermined coding rate $\{c[k_c(k)]|k=1, \ldots, N\}$ output from the feedback signal processing unit 102. Power is controlled by multiplying the square root of each power value output from the feedback signal processing unit 102, $\{E^{1/2}[k_c(k)]|k=1, \ldots, N\}$, by each of the N high-speed downlink shared channels. Accordingly, a signal $\{x[k_c(k)]=E^{1/2}[k_c(k)] \cdot s[k_c(k)](i)|k=1, \ldots, N\}$ is output from each of the P-AMC controllers 211 and 212. Here, s[k](i) is an i-th symbol data of a k-th user, which has been modulated and coded.

The spread spectrum unit 220 includes N spectrum spreaders 221 and 222. Each of the N spectrum spreaders 221 and 222 operates the signal $x[k_c(k)]$ output from a corresponding P-AMC controller 211 or 212 with a spreading signal $\{a[k_c(k),i](t)|k=1, \ldots, N\}$ according to Formula (2). Here, a[k,i](t) is a response at a time "t" to the spreading signal for the i-th symbol data of the k-th user.

$$x[k](t) = E^{1/2}[k] \sum_{i=-\infty}^{\infty} s[k](i) a[k, i](t - iT) \quad \text{Formula (2)}$$

$$a[k, i](t) = \frac{1}{\sqrt{K_{SF}}} \sum_{j=1}^{K_{SF}} c[k, i](j) p(t - jT_c)$$

Here, T is a length of a single symbol, $K_{SF}$ is the order of a spreading filter, p(t) is a function of a chip pulse shape, $T_c$ is a length of a chip, and c[k,i](j) is a j-th chip of a spread spectrum code for the i-th symbol data of the k-th user. Spread spectrum code sequences $\{c[k,i](j)|j=1, \ldots, K_{SF}\}$ are configured such that a spectrum code sequence of a k-th user is orthogonal to those of other users or the k-th user has the same characteristic as other users, where $K_{SF}$ has a value of one (1) or a greater value.

The weight multiplication unit 230 includes a plurality of weight multipliers 231, 232, 233, and 234, which multiply N weights by the signals output from the N spectrum spreaders 221 and 222, respectively. Here, N is the number of antennas. More specifically, each of the weights $\{w_{Tx}[k_c(k),n]|n=1,\ldots,N, k=1,\ldots,N\}$ is multiplied by each of the spreading signals output from the respective N spectrum spreaders 221 and 222 for the N transmission antennas included in the base station 100. As a result, each of the weight multipliers 231 through 234 outputs a signal $\{w_{Tx}[k_c(k),n] \cdot x_c[k_c(k)](t)|n=1,\ldots,N, k=1,\ldots,N\}$.

The adding unit 240 includes N adders 241 and 242 each of which adds the signals output from the weight multiplication unit 230 in correspondence to each of the N antennas and a pilot signal of each antenna, $\{PICH_n|n=1,\ldots,N\}$. The antenna unit 250 transmits signals $$\left\{ x_w[n](t) = \sum_{k=1}^{N} w_{Tx}[k_c(k), n] \cdot x_c[k_c(k)](t) | n = 1, \ldots, N, k = 1, \ldots, N \right\}$$

output from the adding unit 240 through the N antennas, respectively.

The signal reception unit 121 of each of the mobile stations 120 and 130 receives signals, into which different channel characteristics are mixed after the signals are transmitted from the signal transmission unit 101 of the base station 101 over the multichannel 110.

A signal $\{r[m](t)|m=1,\ldots,M\}$ received through each mobile station reception antenna can be expressed by $$r[m](t) = \sum_{n=1}^{N} \sum_{l=0}^{L-1} h[m, n, l] x_w(t - lT_c) + n(t),$$

where $\sum_{n=1}^{N} \sum_{l=0}^{L-1} h[m, n, l] x_w(t - lT_c)$ is a channel response for a transmission signal $x_w(t)$ according to a multipath channel characteristic $$h[m, n](t) = \sum_{l=0}^{L-1} h[m, n, l] \delta(t - lT_c)$$

and n(t) is noise. Here, M is the number of mobile station reception antennas, L is the number of multipaths, and h[m, n, l] is a channel response corresponding to an n-th base station transmission antenna, an m-th mobile station reception antenna, and an l-th path.

The signal reception unit 121 despreads the received signal by applying different delays to respective paths and multiplies the despread signal by weights reflecting the Signal to Interference and Noise Ratio (SINR) characteristic of the despread signal.

Here, despreading is performed according to Formula (3).

$$y[m, l_0] = \int_{-\infty}^{\infty} r[m](t + d(l_0)T_c) a[k_0, 0](t) dt, \qquad \text{Formula (3)}$$

where $$\begin{aligned} y[m, l_0] &= y[m]|_{t=d(l_0)T_c} \\ &= \int_{-\infty}^{\infty} r[m](\tau) a[k_0, 0](\tau - t) d\tau \bigg|_{t=d(l_0)T_c} \\ &= \sqrt{E_d}\, y_d[m](t) s[k_0](0) + \sqrt{E_d}\, y_{SI}[m](t) + \sqrt{E_I}\, y_{MAI}[m](t) + \\ &\quad \sqrt{N_0}\, n'[m](t)|_{t=d(l_0)T_c} \end{aligned}$$

Here, $k_0 = k_c(1)$ indicates a first user, $E_d = E[k_c(1)]$ indicates a sum of powers of the first user's channels, $l_0$ indicates a finger number of the RAKE receiver of the mobile station, $d(l_0)$ indicates a chip delay value of a $l_0$-th finger, and n'[m](t) indicates noise that is received by an m-th mobile station reception antenna and extracted through despreading.

The self-signal $y_d[m](t)$, the self interference signal $y_{SI}[m](t)$, and the multi-user interference signal $y_{MAI}[m](t)$, which are produced during despreading according to Formula (3), can be expressed by Formula (4).

$$y_d[m](t) = \sum_{l=0}^{L-1} \sum_{n=1}^{N} h[m, n, l] w_{Tx}^*[n, k_0] R[k_0, k_0](t - \tau_l) \qquad \text{Formula (4)}$$

$$y_{SI}[m](t) = \sum_{l=0}^{L-1} \sum_{i=-\infty, i \neq 0}^{\infty} \sum_{n=1}^{N} h[m, n, l] w_{Tx}^*[n, k_0] s[k_0](i) R[k_0, k_0](t - iT - \tau_l)$$

$$y_{MAI}[m](t) = \sum_{k=1, k \neq k_0}^{K_c} \frac{\sqrt{E_k}}{\sqrt{E_l}} \sum_{l=0}^{L-1} \sum_{i=-\infty, i \neq 0}^{\infty} \sum_{n=1}^{N} h[m, n, l] w_{Tx}^*[n, k] s[k](i) R[k_0, k](t - iT - \tau_l),$$

where $$R_{k,k_0} = \frac{1}{L} \sum_{l=0}^{L-1} \sum_{l_0=0}^{L-1} c[k, k_0](l) c^*[k, k_0](l_0) R_P[t - (l - l_0)T_c]$$

$$R_P(t) = \int_{-\infty}^{\infty} p(t + \tau) p^*(\tau) d\tau$$

The despread signal obtained according to Formulas (3) and (4) may be expressed by Formula (5).

$$y[m, l_0] = \int_{l_0 T_c}^{l_0 T_c + T} r[m](t) a[k_0, 0](t - l_0 T_0) \, dt \quad \text{Formula (5)}$$

Here, m=1, ..., M, and $l_0$=0, ..., $L_0$−1.

The despread signal can be combined with weights $\{w_{Rx}[m,l_0]|m=1, \ldots, M, l_0=0, \ldots, L_0-1\}$ reflecting the SINR characteristic of each path according to Formula (6).

$$y = \sum_{m=1}^{M} \sum_{l_0=0}^{L_0-1} w_{Rx}^*[m, l_0] y[m, l_0] \quad \text{Formula (6)}$$

$$= w_{Rx}^H y_{Rx}$$

$$= y_d(w_{Tx}) + y_{SI}(w_{Tx}) + y_{MAI}(\{w_{Tx,I}\}) + n$$

Here, $w_{Rx} = [w_{Rx}[1,0]\ w_{Rx}[2,0]\ \ldots\ w_{Rx}[1,1]\ w_{Rx}[2,1] \ldots w_{Rx}[M, L_0-1]]^T$, and $y_{Rx} = [y[1,0]\ y[2,0]\ \ldots\ w[1,1]\ w[2,1] \ldots w[M, L_0-1]]^T$. In each signal, either a weight $w_{Tx}$ or a weight $\{w_{Tx,I}\}$ is expressed as a factor because a base station transmission weight used for a self-signal and a self interference signal is different from that used for another user interference signal, and they are expressed by $w_{Tx}$ and $\{w_{Tx,I}\}$, respectively, which are orthogonal to each other.

The SINR may be calculated by Formula (7).

$$SINR(W_{Tx})\big|_{w_{Tx} = [w_{Tx}, w_{Tx,I}]} = \frac{|y_d(w_{Tx})|^2}{E[|y_{SI}(w_{Tx}) + y_{MAI}(\{w_{Tx,I}\}) + n|^2]} \quad \text{Formula (7)}$$

According to the combination expressed by Formula (6), a signal $$y = \sum_{m=1}^{M} \sum_{l_0=0}^{L_0-1} w_{Rx}^*[m, l_0] \cdot y[k_0, l_0]$$

is detected. Here, $w_{Rx}[m,l]$ is a weight applied to each finger, each reception antenna included in a motile station, and is different from a weight $w_{Tx}$, applied to a base station transmission antenna.

The feedback signal generation unit 122 of each of the mobile stations 120 and 130 extracts pilot signals from received signals, estimates multi-antenna multipath channel characteristics from the extracted pilot signals, performs predetermined processes according to the estimated multi-antennas multipath channel characteristics to generate predetermined information, and transmits the predetermined information to the feedback signal processing unit 102 of the base station 100. Such an operation of the feedback signal generation unit 122 will be described in detail below.

Figure 3:
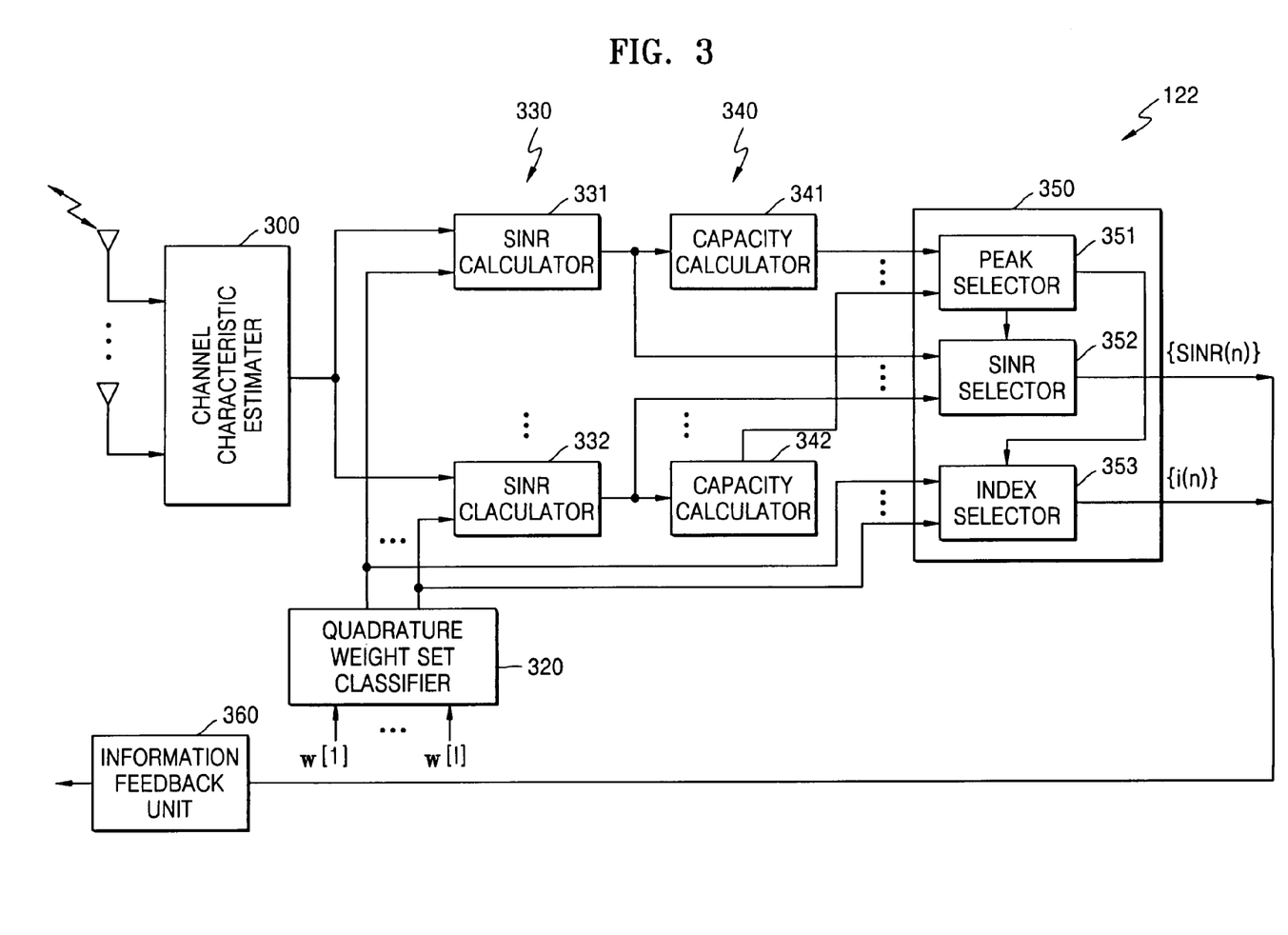
FIG. 3 is a schematic block diagram of a feedback signal generation unit shown in FIG. 1.

FIG. 3 is a schematic block diagram of the feedback signal generation unit 122. As shown in FIG. 3, the feedback signal generation unit 122 includes a channel characteristic estimator 300, a quadrature weight set classifier 320, an SINR calculation unit 330, a capacity calculation unit 340, a peak capacity selection unit 350, and an information feedback unit 360.

The channel characteristic estimator 300 estimates multi-antenna multipath channel characteristics $$\sum_{n=1}^{N} \sum_{l=0}^{L-1} h[m, n, l] x_w(t - lT_c),$$

that is, channel information of the first mobile station 120, using a pilot signal. Here, M is the number of mobile station reception antennas, N is the number of base station antennas, and L is the number of paths.

With respect to I weight vectors $\{w(i)|i=1, \ldots, I\}$ having a size of N, the quadrature weight set classifier 320 groups weight vectors that are orthogonal to one another into a single set. The number of weight vectors included in each set is the same as the number N of transmission antennas. Weights constituting each weight vector are values upon which the base station 100 and the mobile stations 120 and 130 agree in advance and can be prepared in the form of a table. In an embodiment of the present invention, the base station and the mobile station may have the same weight vector table. More specifically, if the base station sends only an index of a weight vector, the mobile station may search for the received index in the table to find the corresponding weight vector.

Figure 4:
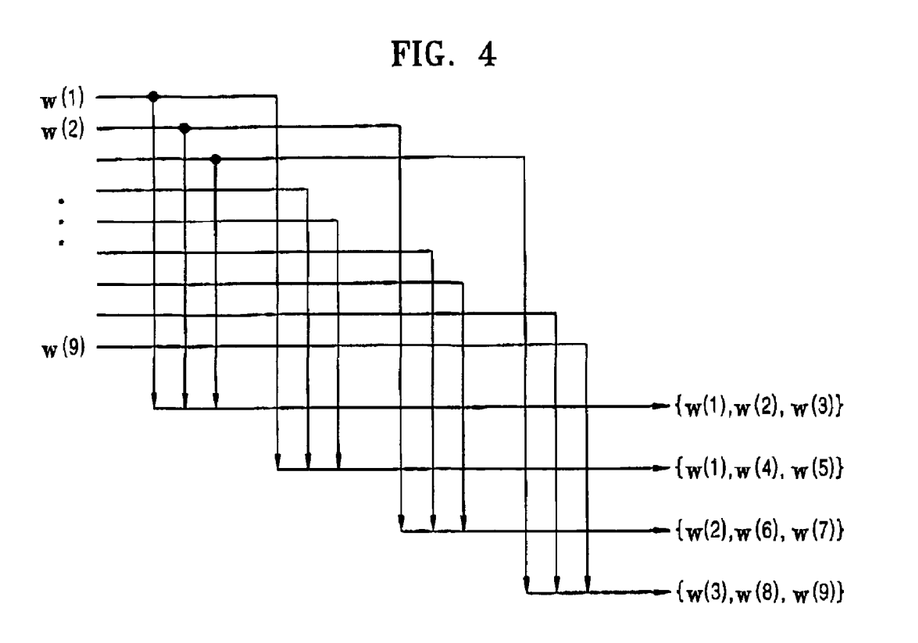
FIG. 4 illustrates an example of an operation of a quadrature weight set classifier shown in FIG. 3.

FIG. 4 illustrates an example of such an operation of the quadrature weight set classifier 320. For example, assuming that I=9 and the weight vectors are $w(1)=e_x=(1,0,0)$, $w(2)=e_y=(0,1,0)$, $w(3)=e_z=(0,0,1)$, $w(4)=(e_y+e_z)/2^{1/2}$, $w(5)=(e_y-e_z)/2^{1/2}$, $w(6)=(e_x+e_z)/2^{1/2}$, $w(7)=(e_x-e_z)/2^{1/2}$, $w(8)=(e_x+e_y)/2^{1/2}$, and $w(9)=(e_x-e_y)/2^{1/2}$. The quadrature weight set classifier 320 groups the weight vectors into sets $\{w(1), w(2), w(3)\}$, $\{w(1), w(4), w(5)\}$, $\{w(2), w(6), w(7)\}$, and $\{w(3), w(8), w(9)\}$, outputs the sets of weight vectors to SINR calculators 331 and 332, and outputs sets of indexes of the respective weight vectors, i.e., $\{1,2,3\}$, $\{1,4,5\}$, $\{2,6,7\}$, and $\{3,8,9\}$, to the peak capacity selection unit 350.

Figure 5:
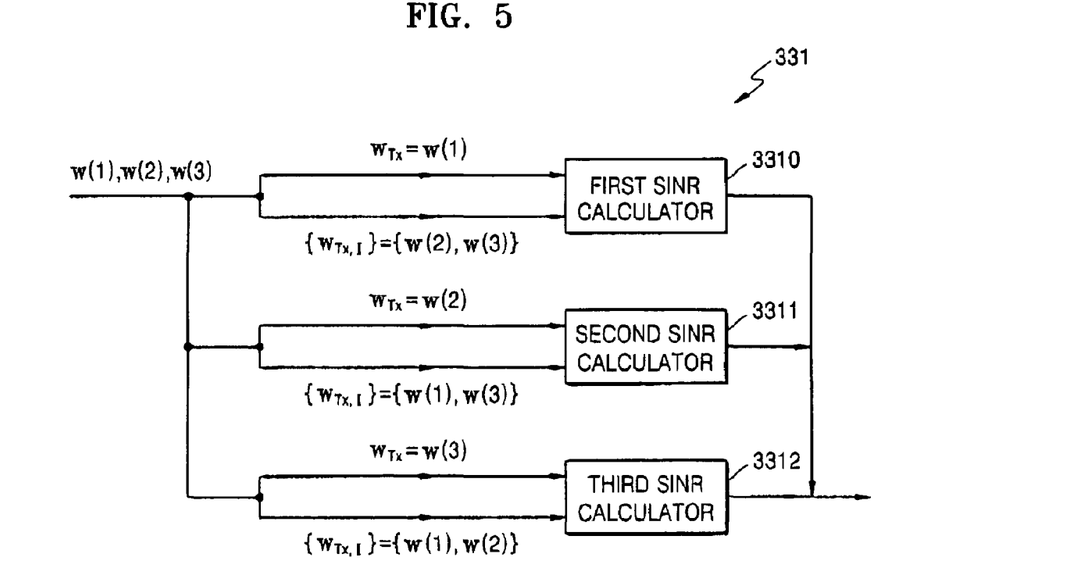
FIG. 5 is a diagram of an embodiment of a Signal to Interference and Noise Ratio (SINR) calculator shown in FIG. 3 based on the operation illustrated in FIG. 4.

The SINR calculation unit 330 includes as many SINR calculators 331 and 332 as the number of sets classified by the quadrature weight set classifier 320. Each of the SINR calculators 331 and 332 receives weight vectors included in each set of weight vectors output from the quadrature weight set classifier 320. FIG. 5 is a diagram of an embodiment of the SINR calculator 331 based on the operation illustrated in FIG. 4. As shown in FIG. 5, first through third SINR calculators 3310, 3311, and 3312 each calculates an SINR using Formula (7) or Formula (8), as which Formula (7) is rewritten, the channel characteristic input from the channel characteristic estimator 300, and a weight set $\{w_{Tx}, \{w_{Tx,I}\}\}$ input from the quadrature weight set classifier 320. For example, the first SINR calculator 3310 calculates an SINR using $w_{Tx} = w(1)$ and $\{w_{Tx,I}\} = \{w(2), w(3)\}$. The second SINR calculator 3311 calculates an SINR using $w_{Tx} = w(2)$ and $\{w_{Tx,I}\} = \{w(1), w(3)\}$. The third SINR calculator 3312 calculates an SINR using $w_{Tx} = w(3)$ and $\{w_{Tx,I}\} = \{w(1), w(2)\}$.

$$SINR \approx \frac{\left|\sum_{m=1}^{M} \sum_{l=1}^{L} w_{Rx}^*[m, l] g[1, m, l]\right|^2 E_1}{\frac{1}{K_{SF}} \sum_{k=1}^{K} \sum_{m=1}^{M} \sum_{l=1}^{L} |w_{Rx}^*[l]|^2 \sum_{\substack{l_0=1, \\ l_0 \neq l}}^{L} |g[k, l_0]|^2 E_k + \sum_{m=1}^{M} \sum_{l=1}^{L} |w_{Rx}^*[l]|^2 N_0} \quad \text{Formula (8)}$$

-continued $$= \frac{\left[\sum_{m=1}^{M}\sum_{l=1}^{L} w_{Rx}^*[m,l](w_1^H h[m,l])\right]^2 E_1}{\frac{1}{K_{SF}}\sum_{k=1}^{K}\sum_{m=1}^{M}\sum_{l=1}^{L} |w_{Rx}^*[l]|^2 \sum_{\substack{l_0=1, \\ l_0 \neq l}}^{L} |w_k^H h[m,l]|^2 E_k + \sum_{m=1}^{M}\sum_{l=1}^{L} |w_{Rx}^*[l]|^2 N_0}$$

$$= \frac{\left[\sum_{m=1}^{M}\sum_{l=1}^{L} |w_1^H h[m,l]|^2\right]^2 E_1}{\frac{1}{K_{SF}}\sum_{k=1}^{K}\sum_{m=1}^{M}\sum_{l=1}^{L} |w_1^H h[m,l]|^2 \sum_{\substack{l_0=1, \\ l_0 \neq l}}^{L} |w_k^H h[m,l]|^2 E_k + \sum_{m=1}^{M}\sum_{l=1}^{L} |w_1^H h[m,l]|^2 N_0}$$

Referring back to FIG. 3, the capacity calculation unit 340 includes as many capacity calculators 341 and 342 as the number of the SINR calculators 331 and 332. Each of the capacity calculators 341 and 342 calculates N capacities from N SINRs output from each of the SINR calculators 331 and 332 based on a Shannon bound $\{\log_2 [1+\text{SINR}(k)] | k=1, \ldots, N\}$, and sums the calculated N capacities.

The peak capacity selection unit 350 includes a peak selector 351, an SINR selector 352, and an index selector 353. The peak selector 351 compares output values of the capacity calculators 341 and 342 and selects a peak value. The SINR selector 352 outputs the N SINRs $\{\text{SINR}[n]|n=1, \ldots, N\}$ received from the SINR calculator 331 or 332 corresponding to the peak value selected by the peak selector 351. The index selector 353 outputs the indexes $\{i[n]|n=1, \ldots, N\}$ of weights selected by the peak selector 351 among the indexes received from the quadrature weight set classifier 320 to the information feedback unit 360.

The information feedback unit 360 converts the SINRs and the indexes output from the peak capacity selection unit 350 into a feedback signal suitable for transmission and forwards the feedback signal to the feedback signal processing unit 102 of the base station 100.

The feedback signal processing unit 102 combines the received indexes and SINRs for each mobile station to restore feedback information, and performs predetermined processes on the feedback information to generate various types of information to be applied to transmission antennas.

Figure 6:
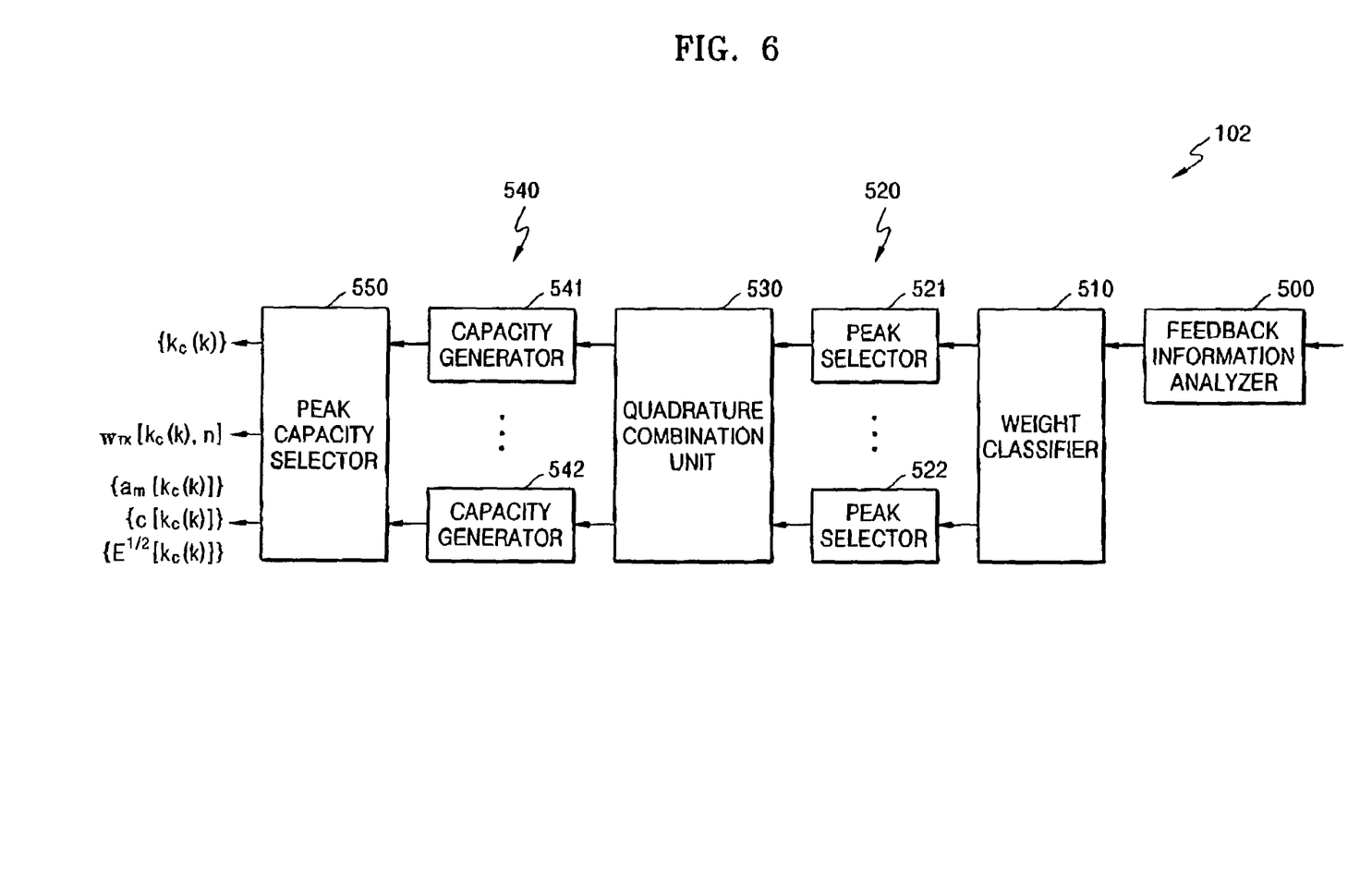
FIG. 6 is a schematic block diagram of a feedback signal processing unit shown in FIG. 1.

FIG. 6 is a schematic block diagram of the feedback signal processing unit 102. The feedback signal processing unit 102 includes a feedback information analyzer 500, a weight classifier 510, a peak selection unit 520, a quadrature combination unit 530, a capacity generation unit 540, and a peak capacity selector 550.

The feedback information analyzer 500 analyzes feedback signals received from the respective mobile stations 120 and 130 and extracts SINRs and weight indexes.

The weight classifier 510 combines SINRs and weight indexes by mobile stations and classifies the combined results $\{i[k,n], \text{SINR}([k,n])\}$ for a k-th mobile station by the weight indexes $\{i[k,n]\}$. As a result, a plurality of SINRs correspond to a single index.

The peak selection unit 520 includes a plurality of peak selectors 521 and 522, each of which selects a peak SINR from among the plurality of SINRs corresponding to each index.

With respect to each weight index and the SINRs corresponding to the weight index, the quadrature combination unit 530 combines weight vectors, which correspond to weight indexes $\{i[k,n]\}$ and orthogonal to one another, into a single set, as shown in FIG. 4, and outputs a set of SINRs corresponding to each set of the weight vectors to the capacity generation unit 540.

The capacity generation unit 540 includes as many capacity generators 541 and 542 as the number of sets of SINRs output from the quadrature combination unit 530. Each of the capacity generators 541 and 542 calculates capacities for the SINRs included in each set based on the Shannon bound and sums the calculated capacities.

The peak capacity selector 550 compares the summed results output from the capacity generators 541 and 542 to select a peak value, and generates power and modulation coding information using the indexes of weight vectors corresponding to the selected peak value, the weight vectors $w_{Tx}[k_c(k),n] = w[i(k_c(k))]$, and the corresponding SINRs. To generate power and modulation coding information based on SINRs, any type of conventional method, such as a method using a table, may be used. The generated power and modulation coding information is output to the signal transmission unit 101 of the base station 100.

According to the present invention, mobile stations obtain quadrature weight vectors reflecting downlink characteristics of multiple antenna and multipath channels and quadrature combinations of SINRs corresponding to channel state information reflecting the orthogonality and feed back to a base station quadrature weight vectors and quadrature combinations of SINRs, which can give a peak throughput, among the obtained quadrature weight vectors and quadrature combinations of SINRs. Then, the base station selects a combination corresponding to a peak throughput from among combinations of weights allowing a nulling process and applies the selected combination to transmission antennas thereof so that a transmission throughput of high speed downlink shared channels is maximized. Particularly, in transmission using N base station antennas, N antennas of each mobile station, and K mobile stations, a transmission capacity can be theoretically increased by a maximum of $N*\log_2(1+\text{SNR}*K)$ times (where SNR is a signal-to-noise ratio) so that a Shannon capacity may be achieved.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A wireless communication system, comprising:
   a base station that applies predetermined weight vectors to multi-user signals and transmits the multi-user signals through a plurality of transmission antennas; and
   a plurality of mobile stations that receive and process the multi-user signals,
   wherein each of the plurality of mobile station includes:
      a signal reception unit that processes the multi-user signals; and
      a feedback signal generation unit that estimates channel characteristics, over which the multi-user signals have been transmitted, from the multi-user signals, classifies a plurality of weight vectors to be applied to the estimated channel characteristics into a plurality of sets such that vectors orthogonal to one another are classified into a single set, selects a set maximizing a transmission capacity from among the classified sets, and feeds back weight indexes of weight vectors included in the selected set and weighted channel information to the base station.

2. The wireless communication system as claimed in claim 1, wherein a number of the plurality of weight vectors included in each set is equal to a number of the plurality of transmission antennas.

3. The wireless communication system as claimed in claim 1, wherein the weight indexes fed back by the feedback signal generation unit are used as information to determine the predetermined weight vectors in the base station.

4. The wireless communication system as claimed in claim 1, wherein the feedback signal generation unit comprises:
   a channel characteristic estimator that estimates the channel characteristics;
   a quadrature weight set classifier that groups a predetermined number of vectors that are orthogonal to one another from among the plurality of weight vectors into a single set and outputs the weight indexes of the weight vectors of each set;
   a plurality of Signal Interference to Noise Ratio (SINR) calculators, each of which applies weight vectors included in each set to the channel characteristics and calculates SINRs using the weighted channel characteristics;
   a plurality of capacity calculators, each of which correspond to one of the plurality of SINR calculators, and each of which calculates transmission capacities using SINRs received from a corresponding one of the plurality of SINR calculators and sums the transmission capacities;
   a peak capacity selection unit that selects a capacity calculator giving a peak of the summed transmission capacities, and outputs SINRs that are received from an SINR calculator corresponding to the selected capacity calculator and weight indexes corresponding to the selected capacity calculator; and
   an information feedback unit that feeds back the SINRs and the weight indexes that are received from the peak capacity selection unit to the base station.

5. The wireless communication system as claimed in claim 4, wherein the base station and the plurality of mobile stations comprise a same table in which indexes correspond to weight vectors, respectively.

6. The wireless communication system as claimed in claim 4, wherein the base station further comprises:
   a feedback signal processing unit that classifies weight indexes and SINRs, which are received from the plurality of mobile stations, for each of the plurality of mobile stations, reclassifies the classified SINRs by the weight indexes, selects a peak SINR from among the classified SINRs, classifies weight vectors corresponding to the weight indexes into a plurality of sets, selects a set giving a peak transmission capacity from among the sets, outputs weight indexes included in the selected set and predetermined types of information measured from the weight indexes and the peak SINR.

7. The wireless communication system as claimed in claim 6, wherein the base station further comprises:
   a signal transmission unit that transmits the multi-user signal through the plurality of transmission antennas, the signal transmission unit including:
      a channel selector that selects channels corresponding to mobile station indexes output from the feedback signal processing unit from among a plurality of channels;
      a plurality of power and modulation coding controllers that control powers of the selected channels and modulate and code the selected channels, according to the predetermined types of information output from the feedback signal processing unit;
      a plurality of spectrum spreaders that spreads signals output from the respective power and modulation coding controllers using predetermined spreading signals, respectively; and
      a signal processor that applies a number of transmission antenna weights equal to a number of the plurality of transmission antennas to signals output from each spectrum spreader, sums the transmission antenna weighted signals for each transmission antenna, and outputs results of summations.

8. The wireless communication system as claimed in claim 7, wherein the signal reception unit of each of the plurality of mobile stations despreads the received multi-user signals by applying different delays to each path, and applies weights reflecting SINR characteristics of the despread multi-user signals for each path.

9. The wireless communication system as claimed in claim 6, wherein a number of the plurality of weight vectors included in each set is equal to a number of the plurality of transmission antennas.

10. The wireless communication system as claimed in claim 6, wherein the feedback signal processing unit comprises:
   a feedback information analyzer that classifies the weight indexes and the SINRs, which are received from the mobile stations, for each of the mobile stations;
   a weight classifier that reclassifies the classified SINRs by the weight indexes;
   a plurality of peak selectors each of which selects a peak SINR from among the reclassified SINRs;
   a quadrature combination unit that combines weight vectors that are orthogonal to one another into a single set from among the weight vectors corresponding to the weight indexes;
   a plurality of capacity generators each of which calculates transmission capacities from peak SINRs corresponding to weight indexes of weight vectors included in each set and sums the calculated transmission capacities; and
   a peak capacity selector that selects a peak value from among values output from the capacity generators and outputs weight indexes included in a set corresponding to the selected peak value, mobile station indexes, and power and modulation coding information obtained from the peak SINRs.

11. The wireless communication system as claimed in claim 10, wherein the base station further comprises:
   a signal transmission unit that transmits the multi-user signals through the plurality of transmission antennas, the signal transmission unit including:
      a channel selector that selects channels corresponding to the mobile station indexes output from the peak capacity selector from among a plurality of channels;
      a plurality of power and modulation coding controllers that control powers of the selected channels and modulate and code the selected channels, according to the power and modulation coding information output from the peak capacity selector;

a plurality of spectrum spreaders that spread signals output from the respective power and modulation coding controllers using predetermined spreading signals, respectively; and a signal processor that applies a number of transmission antenna weights equal to the number of the plurality of transmission antennas to signals output from each spectrum spreader, sums the transmission antenna weighted signals for each transmission antenna, and outputs results of summations.

12. The wireless communication system as claimed in claim 11, wherein each of the spectrum spreaders uses a spread spectrum code sequence $\{c[k,i](j)|j=1, \ldots, K_{SF}\}$ as the predetermined spreading signal, and the spread spectrum code sequence is configured such that a spectrum code sequence of a k-th user is orthogonal to that of other users or the k-th user has a same characteristic as other users, where $K_{SF}$ has a value of one (1) or a greater value.

13. The wireless communication system as claimed in claim 11, wherein the transmission antenna weights correspond to the weight indexes output from the peak capacity selector.

14. The wireless communication system as claimed in claim 11, wherein the signal reception unit of each mobile station despreads the received multi-user signals by applying different delays to respective paths, and applies weights reflecting SINR characteristics of the despread multi-user signals for each path.

15. A mobile station that receives a user signal including multi-user signals from a base station, the mobile station comprising:

a signal reception unit that processes the user signal; and a feedback signal generation unit that estimates channel characteristics, over which the multi-user signals have been transmitted, from the multi-user signals, classifies a plurality of weight vectors to be applied to the estimated channel characteristics into a plurality of sets, selects a set maximizing a transmission capacity from among the classified sets, and feeds back indexes of weight vectors included in the selected set and weighted channel information obtained from weighted channel characteristics corresponding to the selected set to the base station.

16. The mobile station as claimed in claim 15, wherein a number of weight vectors included in each set is equal to a number of the plurality of transmission antennas included in the base station.

17. The mobile station as claimed in claim 15, wherein the plurality of weight vectors used by the mobile station is the same as the plurality of weight vectors used by the base station.

18. The mobile station as claimed in claim 17, wherein the feedback signal generation unit comprises:

a channel characteristic estimator that estimates the channel characteristics;

a quadrature weight set classifier that groups a predetermined number of vectors that are orthogonal to one another from among the plurality of weight vectors into a single set and outputs the weight indexes of the weight vectors of each set;

a plurality of Signal Interference to Noise Ratio (SINR) calculators, each of which separately applies weight vectors included in each set to the channel characteristics, calculates power of each weighted channel characteristic, and calculates SINRs using the calculated power;

a plurality of capacity calculators, each of which correspond to one of the plurality of SINR calculators and each of which calculates transmission capacities using SINRs received from a corresponding one of the plurality of SINR calculators and sums the transmission capacities;

a peak capacity selection unit that selects a capacity calculator giving a peak of the summed transmission capacities, and outputs SINRs that are received from an SINR calculator corresponding to the selected capacity calculator and weight indexes corresponding to the selected capacity calculator; and an information feedback unit that feeds back the SINRs and the weight indexes that are received from the peak capacity selection unit to the base station.

19. A base station that processes a user signal based on mobile station index information for channel selection and Signal Interference to Noise Ratio (SINR) information of selected channels, information being fed back from a plurality of mobile stations, and transmits the processed access signal through a plurality of antennas, the base station comprising:

a feedback signal processing unit that classifies indexes and SINRs, which are received from the plurality of mobile stations, for each of the mobile stations, reclassifies the classified SINRs by the weight indexes, selects a peak SINR from among the classified SINRs, classifies weight vectors corresponding to the weight indexes into a plurality of sets, selects a set giving a peak transmission capacity from among the sets, outputs mobile station indexes and predetermined types of information measured from the peak SINR that correspond to the selected set; and a signal transmission unit that selects channels, over which the user signals are to be transmitted, using the predetermined types of information output from the feedback signal processing unit, modulates and codes the user signals, processes the user signals by applying weight vectors corresponding to the respective selected channels to the user signal, and transmits the processed user signals through the plurality of antennas.

20. The base station as claimed in claim 19, wherein the feedback signal processing unit comprises:

a feedback information analyzer that classifies the weight indexes and the SINRs, which are received from the mobile stations, for each mobile station;

a weight classifier that reclassifies the classified SINRs by the weight indexes;

a plurality of peak selectors each of which selects a peak SINR from among the reclassified SINRs;

a quadrature combination unit that combines weight vectors that are orthogonal to one another into a single set from among the weight vectors corresponding to the weight indexes;

a plurality of capacity generators each of which calculates transmission capacities from peak SINRs corresponding to weight indexes of weight vectors included in each set and sums the calculated transmission capacities; and a peak capacity selector that selects a peak value from among values output from the capacity generators and outputs weight indexes included in a set corresponding to the selected peak value, mobile station indexes, and power and modulation coding information obtained from the peak SINRs.

21. The base station as claimed in claim 19, wherein the signal transmission unit comprises:
- a channel selector that selects channels corresponding to mobile station indexes output from the feedback signal processing unit from among a plurality of channels;
- a plurality of power and modulation coding controllers that control power of the selected channels and modulate and code the selected channels, according to the predetermined types of information output from the feedback signal processing unit;
- a plurality of spectrum spreaders that spreads signals output from the respective power and modulation coding controllers using predetermined spreading signals, respectively; and
- a signal processor that applies weights vectors corresponding to the respective selected channels to signals output from each spectrum spreader, sums the weighted signals for each transmission antenna, and outputs results of summations through the respective corresponding antennas.

22. A wireless communication method, comprising:
- transmitting multi-user signals through a plurality of transmission antennas from a base station;
- receiving and processing the multi-user signals by a mobile station;
- estimating characteristics of channels, through each of which the multi-user signals are transmitted, from the detected multi-user signals;
- classifying a plurality of weight vectors to be applied to the measured channel characteristics into sets such that a predetermined number of weight vectors orthogonal to one another is grouped into a single set;
- applying each of weight vectors included in each set to the channel characteristics to generate weighted channel characteristics and selecting a set maximizing a transmission capacity based on the weighted channel characteristics of each set; and
- feeding back indexes of the weight vectors included in the selected set and weighed channel information obtained from the weighted channel characteristics corresponding to the selected set.

23. The wireless communication method as claimed in claim 22, wherein the plurality of weight vectors used by the mobile station is the same as those used in the base station.

24. The wireless communication method as claimed in claim 23, further comprising:
- the base station classifying weight indexes and weighted channel information, which are received from a plurality of mobile stations, for each of the mobile stations;
- reclassifying the weighted channel information by the weight indexes;
- selecting peak weighted channel information from each reclassified weighted channel information corresponding to each weight index and classifying weight vectors corresponding to the weight indexes into sets by combining a predetermined number of vectors orthogonal to one another into a single set;
- selecting a set maximizing the transmission capacity based on the peak weighted channel information corresponding to weight vectors included in each set; and
- outputting mobile station indexes belonging to the selected set and predetermined types of information measured from peak weighted channel information corresponding to the selected set.

25. The wireless communication method as claimed in claim 24, wherein the weighted channel information indicates a Signal Interference to Noise Ratio (SINR), and the predetermined types of information is power, modulation, and coding information.

26. The wireless communication method as claimed in claim 25, further comprising:
- the base station selecting channels corresponding to the mobile station indexes from among a plurality of channels;
- controlling a power of each of the selected channels and modulating and coding the selected channels according to the power, modulation, and coding information;
- spreading signals, which have been transmitted through the power-controlled, modulated, and coded channels using predetermined spreading signals; and
- applying weight vectors corresponding to the selected channels to spreading signals, summing the weighted signals for each transmission antenna, and outputting a result of summing the signals through each corresponding transmission antenna.

* * * * *